(12) United States Patent
Meliksetian et al.

(10) Patent No.: US 7,363,317 B2
(45) Date of Patent: Apr. 22, 2008

(54) MEMORY EFFICIENT XML SHREDDING WITH PARTIAL COMMIT

(75) Inventors: Dikran S. Meliksetian, Danbury, CT (US); George Andrei Mihaila, Yorktown Heights, NY (US); Nianjun Zhou, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 289 days.

(21) Appl. No.: 11/058,020

(22) Filed: Feb. 15, 2005

(65) Prior Publication Data

US 2006/0184552 A1    Aug. 17, 2006

(51) Int. Cl.
  *G06F 17/30* (2006.01)
(52) U.S. Cl. ................................. 707/103 R; 709/213
(58) Field of Classification Search .................... 707/1, 707/103 R
  See application file for complete search history.

(56) References Cited

U.S. PATENT DOCUMENTS

| | | | |
|---|---|---|---|
| 5,499,371 A | | 3/1996 | Henninger et al. |
| 5,694,598 A | * | 12/1997 | Durand et al. .......... 707/103 R |
| 5,893,125 A | * | 4/1999 | Shostak ...................... 715/511 |
| 6,078,927 A | * | 6/2000 | Blackman et al. ...... 707/103 R |
| 6,631,379 B2 | | 10/2003 | Cox |
| 6,704,736 B1 | | 3/2004 | Rys et al. |
| 6,889,226 B2 | * | 5/2005 | O'Neil et al. ................ 707/100 |
| 2002/0010700 A1 | * | 1/2002 | Wotring et al. ............. 707/100 |
| 2002/0099712 A1 | | 7/2002 | Brandin et al. |
| 2002/0099715 A1 | | 7/2002 | Jahnke et al. |
| 2002/0116371 A1 | * | 8/2002 | Dodds et al. ................... 707/3 |
| 2002/0120598 A1 | * | 8/2002 | Shadmon et al. ............... 707/1 |
| 2002/0133484 A1 | | 9/2002 | Chau et al. |
| 2003/0101169 A1 | | 5/2003 | Bhatt et al. |
| 2003/0101194 A1 | | 5/2003 | Rys et al. |

* cited by examiner

*Primary Examiner*—Apu Mofiz
*Assistant Examiner*—SyLing Yen
(74) *Attorney, Agent, or Firm*—John E. Campbell; Jeffrey Giunta; Fleit Kain Gibbons Gutman Bongini & Bianco P.L.

(57) ABSTRACT

A method and system that allows efficient shredding of large instances of hierarchical data structures into relational data structures. Large instances of hierarchical data structures, which are able to be larger than the random access storage of a computer used to shred them into relational data structures, are incrementally shredded into a temporary storage. When the amount of data shredded into the temporary storage reaches or exceeds a predetermined commit count, the data in the temporary storage is transferred to a relational data structure maintained by a relational database manager. A Document Type Description annotation is provided to allow the end user to specify execution order for SQL commands and to specify commit count values.

6 Claims, 10 Drawing Sheets

US 7,363,317 B2

MEMORY EFFICIENT XML SHREDDING WITH PARTIAL COMMIT

BACKGROUND OF THE INVENTION

1. Field of the Invention

This invention relates to computer data exchange and more specifically to preparing data for relational databases.

2. Description of Related Art

Many applications and systems store data and information in electronic formats. A lot of electronically stored information, such as information conveyed via the world wide web, is stored in hierarchical formats such as in the extended Markup Language (XML). Some applications and systems, however, store electronic information in relational databases. Compatibility between these two data storage techniques is achieved by, for example, XML data shredding, which is the process of producing data in a relational table format from data contained in hierarchical, usually XML data, formats. Many applications, such as life sciences applications or transaction logging applications, transfer large amounts of data in an XML format. Inefficiencies in shredding large XML documents present problems in these fields.

XML documents that have a size that is the same order of magnitude or that is larger than the physical memory of the computer system processing the document, or larger than the size of the relational database log storing the information, create processing inefficiencies that greatly hamper the ability to exchange such large data collections between XML formats and relational database formats.

A need therefore exists to address the above problems in shredding large hierarchical data instances into relational database tables.

SUMMARY OF THE INVENTION

Briefly, in accordance with the present invention, a method for translating data in a hierarchical data structure to a relational data structure includes reading a first part of a hierarchical data structure instance by using a tree traversal algorithm that is defined by a mapping so as to derive at least one data element. The method also includes storing the at least one data element in a first storage and determining when the first storage stores a quantity of data that is greater than a threshold. The method further includes transferring, in response to determining that the first storage stores a quantity of data that is greater than the threshold, data stored in the first storage into a relational data structure according to the mapping.

In another aspect of the present invention, a computer system for translating data from a hierarchical data structure to a relational data structure includes a converter for reading a first part of a hierarchical data structure instance by using a tree traversal algorithm that is defined by a mapping so as to derive at least one data element. The computer system also includes a first storage for storing the at least one data element in a first storage and a relational database controller for determining when the first storage stores a quantity of data that is greater than a threshold. The relational database controller also transfers, in response to determining the first storage stores a quantity of data that is greater than the threshold, data stored in the first storage to a relational data structure according to the mapping.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter which is regarded as the invention is particularly pointed out and distinctly claimed in the claims at the conclusion of the specification. The foregoing and other features and also the advantages of the invention will be apparent from the following detailed description taken in conjunction with the accompanying drawings.

DETAILED DESCRIPTION OF PREFERRED EMBODIMENTS

Exemplary embodiments of the present invention provide a method and system for transforming large XML documents into relational database tables. The exemplary embodiments define the transformation at the structure level rather than the instance level and represent the transformation as a store tree.

Figure 1:
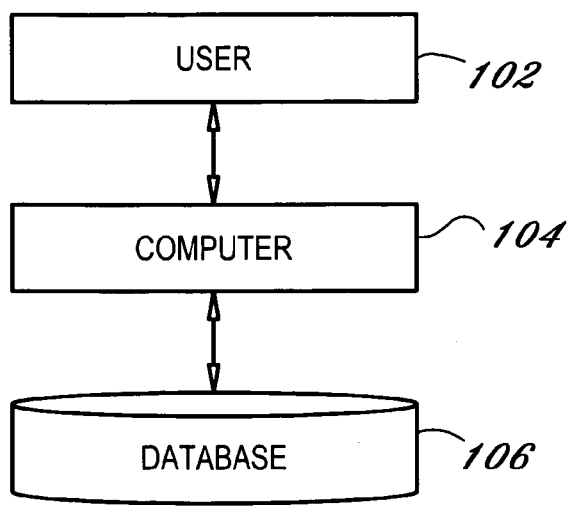
FIG. 1 is a block diagram illustrating the system architecture of a conventional database computer system.

FIG. 1 is a block diagram illustrating the system architecture of a conventional database computer system. A user 102, operating on a client information processing system, or client computer 104, utilizes a client application, such as a database management system (DBMS), on the client computer 104 to interact with the database 106.

In an embodiment of the present invention, the computer system of computer 104 is one or more Personal Computers (PCs) (e.g., IBM or compatible PC workstations running the Microsoft Windows operating system, Macintosh computers running the Mac OS operating system, or the like), Personal Digital Assistants (PDAs), game consoles or any other information processing devices. In another embodiment, the computer system of computer 104 is a server system (e.g., SUN Ultra workstations running the SunOS operating system or IBM RS/6000 workstations and servers running the AIX operating system).

In another embodiment of the present invention, the database 106 is a part of the computer system of computer 104. In yet another embodiment of the present invention, the database 106 is a part of another computer system (such as a server system) separate from computer 104 (a client system). In this embodiment, the computer 104 communicates with the computer system of database 106 over a network or other communication medium.

In yet another embodiment of the present invention, an optional network connects computer 104 and database 106. In one embodiment, the network is a circuit switched network, such as the Public Service Telephone Network (PSTN). In another embodiment, the network is a packet switched network. The packet switched network is a wide area network (WAN), such as the global Internet, a private WAN, a local area network (LAN), a telecommunications network or any combination of the above-mentioned networks. In yet another embodiment, the network is a wired network, a wireless network, a broadcast network or a point-to-point network.

In an embodiment where the database 106 is a part of a server computer system that is separate from client computer 104, certain data translation tasks at client computer 104 are performed by a client application, such as a Java applet, a Java scriptlet, Java script, Perl script, an Active X control or any self-sufficient application executing on the computer system of computer 104. Further, certain data translation tasks at the server system of database 106 are performed by a server application such as a Common Gateway Interface (CGI) script, a Java servlet, a Hypertext Preprocessor (PHP) script, a Perl script or any self-sufficient application executing on the server system of database 106.

Figure 2:
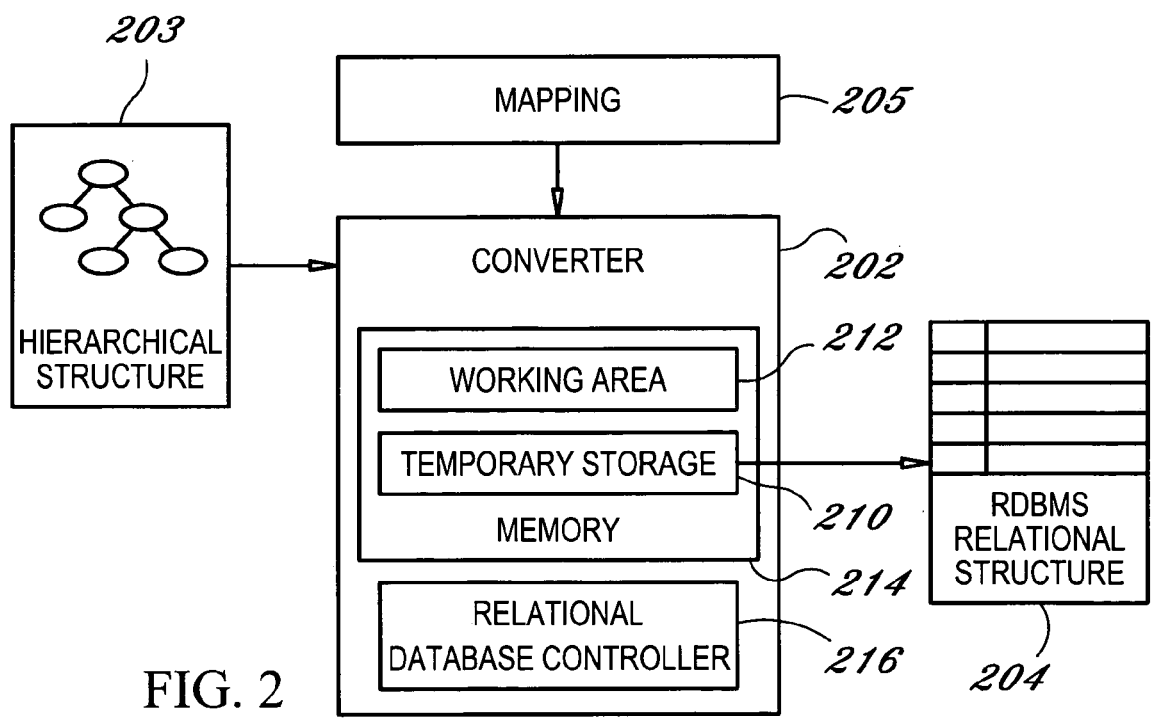
FIG. 2 is a block diagram illustrating the overall process of one embodiment of the present invention.

FIG. 2 is a block diagram illustrating the overall process of one embodiment of the present invention. FIG. 2 shows a converter 202 representing an application or other process for performing the main process of the present invention—the translation of data from a hierarchical data structure to a relational data structure. FIG. 2 also shows a hierarchical data structure 203 and a relational data structure 204. The hierarchical data structure 203 is contained in one or more well-structured XML documents in the exemplary embodiment of the present invention. Using a well structured XML document allows shredding part of the document into an RDBMS before performing a complete walk of the XML document. The relational data structure 204 is populated with data contained in the hierarchical data structure 203 by operation of the converter 202. A mapping 205 is utilized by the converter 202 to specify how the data from the hierarchical data structure 203 is translated to the relational data structure 204. A mapping in this context is a definition used for translating data from one data structure to another data structure. A mapping can be a one-to-one mapping, a many-to-one mapping, a one-to-many mapping or a many-to-many mapping. The process of translating data from a hierarchical data structure 203 to the relational data structure 204 is described in greater detail below.

In one embodiment of the present invention, the hierarchical data structure 203 and the relational data structure 204 reside on one or more databases, such as database 106. As such, a user 102 initiates a converter 202 executing on a client computer, such as computer 104, for translating the data from a hierarchical data structure 203 to the relational data structure 204.

The exemplary embodiment of the present invention is particularly suited for processing large instances of hierarchical data structures 203. These instances contain an amount of data that is larger than the amount of processing memory storage available in computer 104. In order to more efficiently process such large hierarchical data structures 203, the processing of the converter 202 of the exemplary embodiment incrementally processes data in the hierarchical data structure 203. Portions of the hierarchical data structure 203 that are being processed and intermediate relational data structure constructs that are created as portions of the hierarchical data structure 203 is processed are stored in a working area 212 and a temporary storage 210. The working area 212 and the temporary storage 210 of the exemplary embodiment are contained in random access memory 214. A relational database controller 216 operates to write intermediate relational data structures created in the temporary storage 210 into the relational data structure 204 maintained by a relational DBMS. The relational database controller 216 is separate from the relational database management system in the exemplary embodiment and causes the writing of the intermediate relational data structures as the data in the temporary storage 210 reaches a certain size, such as according to the processing described below.

Figures 3A, 4A, 4B:
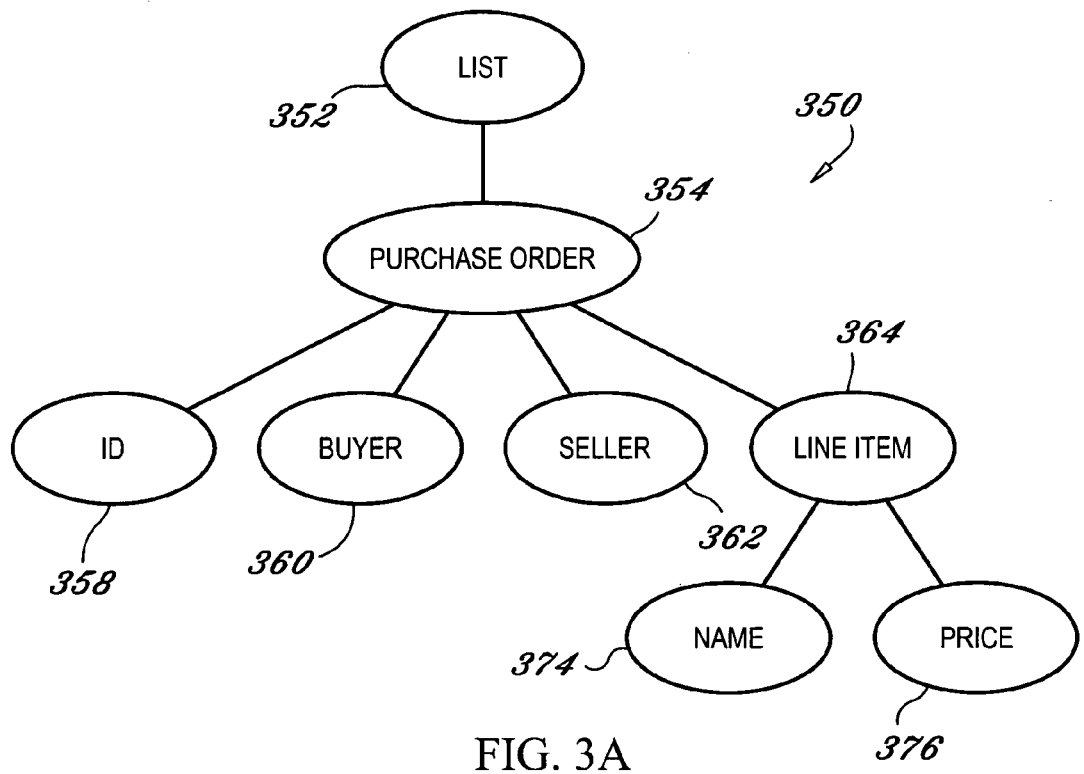
FIG. 3A is a block diagram illustrating a schema of a hierarchical data structure.
FIG. 4A is a block diagram illustrating a relational data structure representing a Purchase Order (PO) table.
FIG. 4B is a block diagram illustrating a relational data structure representing a Line Item (LINEITEM) table.

FIG. 3A is a block diagram illustrating a schema of a hierarchical data structure 350, i.e., a schema tree. The hierarchical data structure 350 is alternatively able to be defined through a Document Type Definitions (DTD) document. The hierarchical data structure 350 is a data structure arranged in a hierarchical format with nodes of the data structure organized in a descending hierarchy. The hierarchical data structure 350 is illustrated using a descending tree structure.

The hierarchical data structure 350 represents an exemplary purchase order list 352 as is typically used by a business or individual desiring to purchase a list of products, goods or services from a vendor or seller. The purchase order list 352 contains a list of purchase orders such as purchase order 354. Each purchase order 354 further contains a purchase order identifier 358, a buyer 360, a seller 362, and a list of line items, such as line item 364. A line item further contains a name 374 and a price 376. Purchase order lists 352 processed by the exemplary embodiment of the present invention generally contain a large number of purchase orders 354 and generally cause the hierarchical data structures to be relatively large.

Hierarchical data structure 350 includes a plurality of nodes. Each node is either a group node or a data node. A group node points to one or more other nodes and is associated with a label, typically designating the type of nodes to which the group node points. For example, as illustrated for the hierarchical data structure 350 illustrated in FIG. 3A, the purchase order list node 352, purchase order node 354, and line item node 364 are group nodes as each of these nodes points to one of more other nodes. Data nodes hold actual data associated with the node as is shown and described in more detail in FIG. 3B. A node identifier uniquely identifies each node.

Figure 3B:
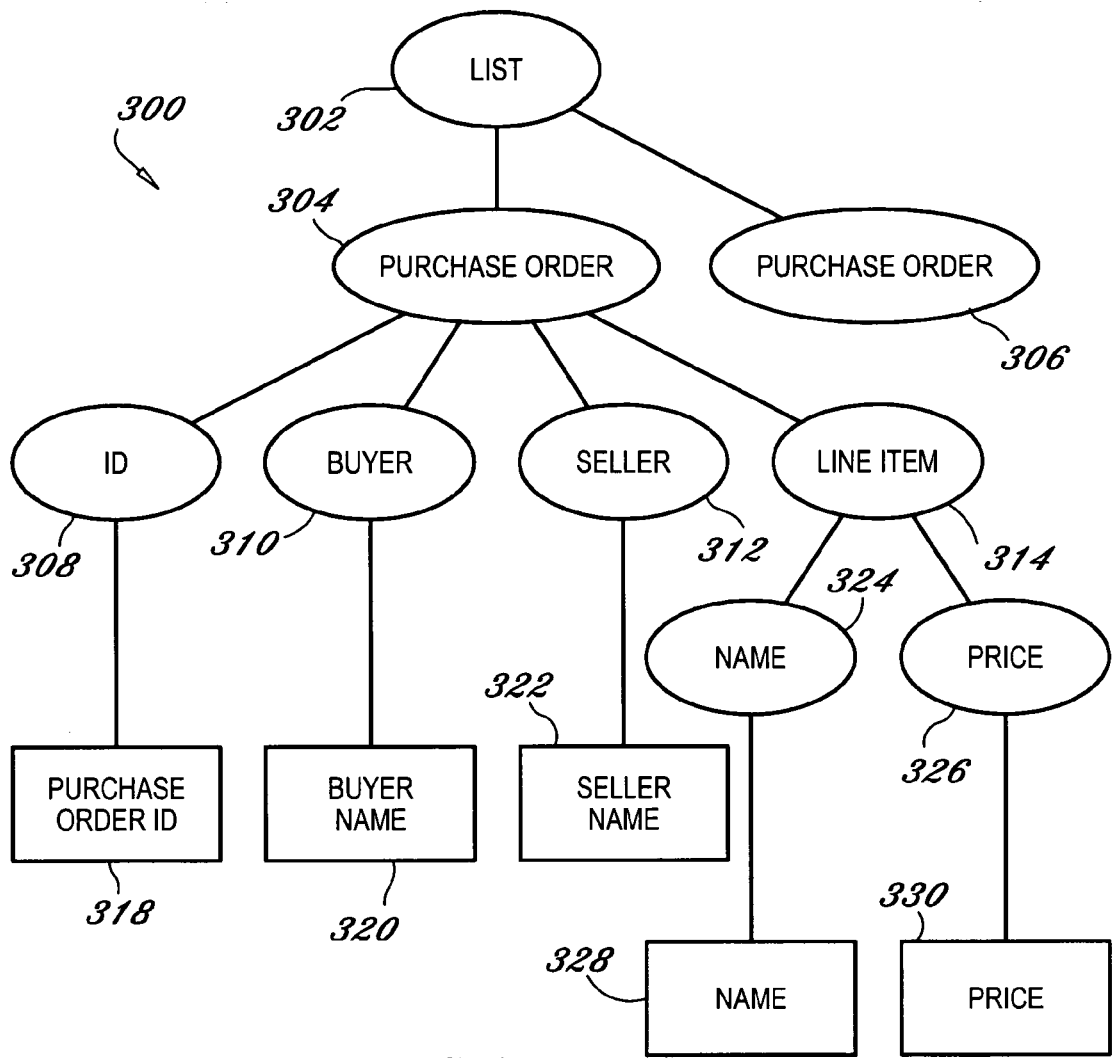
FIG. 3B is a block diagram illustrating one instance of a hierarchical data structure.

FIG. 3B is a block diagram illustrating a hierarchical data structure instance 300, i.e., an instance tree. The hierarchical data structure instance 300 is one instance of the schema tree, i.e., hierarchical data structure 350, illustrated using a descending tree structure.

The hierarchical data structure instance 300 represents an exemplary purchase order list 302 as is typically used by a business or individual desiring to purchase a list of products, goods or services from a vendor or seller. The purchase order list 302 contains a list of purchase orders such as a first purchase order 304 and a second purchase order 306. Each of the purchase orders further contains a purchase order identifier 308, a buyer 310, a seller 312, and a list of line items, such as line item 314. Each line item 314 further contains a name 324 and a price 326.

As explained above, each node in hierarchical data structure instance 300 is either a group node or a data node. A group node points to one or more other nodes and is designated by a circular shape in FIG. 3B. A group node is also associated with a label, typically designating the type of nodes to which the group node points. A data node holds actual data associated with the node and is designated by a rectangular shape in FIG. 3B. For example, the purchase order list node 302, first purchase order node 304, second purchase order node 306, purchase order identifier node 308, buyer node 310, seller node 312, line item node 314, name node 324, and price node 326 are group nodes as each of these nodes points to one of more other nodes. Purchase order name node 318, buyer name node 320, seller name node 322, name node 328 and price node 330 are data nodes as each of these nodes contains data associated to the instance of that node.

Although the hierarchical data structure instance 300 shows only two purchase orders, i.e., the first purchase order 304 and the second purchase order 306, and only one line item 314, these are shown for clarity of explanation in this example only and an instance of the hierarchical data structure instance 300 supports any number of purchase orders and/or line items. Also, any group node in an instance of the hierarchical data structure instance 300 supports any number of child nodes. The large hierarchical data structures 300 that are efficiently processed by the exemplary embodiment generally have many child nodes.

FIGS. 4A and 4B are block diagrams illustrating relational data structures arranged in a relational format, with elements of the relational data structure arranged in multiple rows having one or more columns. The relational data structure is illustrated using a table structure. Each relational data structure includes a table having at least one column. Each table can contain many tuples, which are illustrated as rows, of data elements in the table.

FIG. 4A is a block diagram illustrating a relational data structure 402 representing a Purchase Order (PO) table 402. A table consists of one or more rows, such as row 408. A row is a group of data values, conceptually arranged horizontally in columns, as shown in FIG. 4A. The PO table relational data structure 402 represents some of the data contained in the exemplary purchase order described in the above discussion of FIG. 3A and FIG. 3B. The purchase order contained in this table contains a purchase order identifier 418 (in a first column of the row 408), a buyer 420 (in a second column of the row 408) and a seller 422 (in a third column of the row 408). Each PO further has one or more associated Line Items (or items for purchase) that correspond to the Line Item 314. The line item data is stored in another relational data structure that is described with reference to FIG. 4B.

FIG. 4B is a block diagram illustrating a relational data structure representing a Line Item (LINEITEM) table 404. The exemplary table consists of a first row 410 and a second row 412. A row is a group of data values, conceptually arranged horizontally in columns, as shown in FIG. 4B. The relational data structure 404 represents an exemplary Line Item list, as described with reference to FIG. 3A and FIG. 3B above. The exemplary Line Item list includes two Line Items. The first Line Item is a notebook in the second column 430 of first row 410. The notebook Line Item is identified by a Purchase Order Id in the first column 428 of the first row 410. The notebook is further described by its associated price in the third column 432 of the first row 410. The second Line Item is a sleeping bag in the second column 430 of second row 410. The sleeping bag Line Item is identified by a Purchase Order Id in the first column 428 of the second row 410. The sleeping bag is further described by its associated price in the third column 432 of the second row 410.

The ID column 418 of the PO table 402 and the POID column 428 of the LINEITEM table 404 each contain the identifier of the purchase order that contains the data in each row of the two exemplary tables discussed above. The data in the ID column 418 and the POID column 428 serves to link the data in the LINEITEM table 404 to the associated data on the same purchase order that is stored in the PO table 402.

Figure 6:
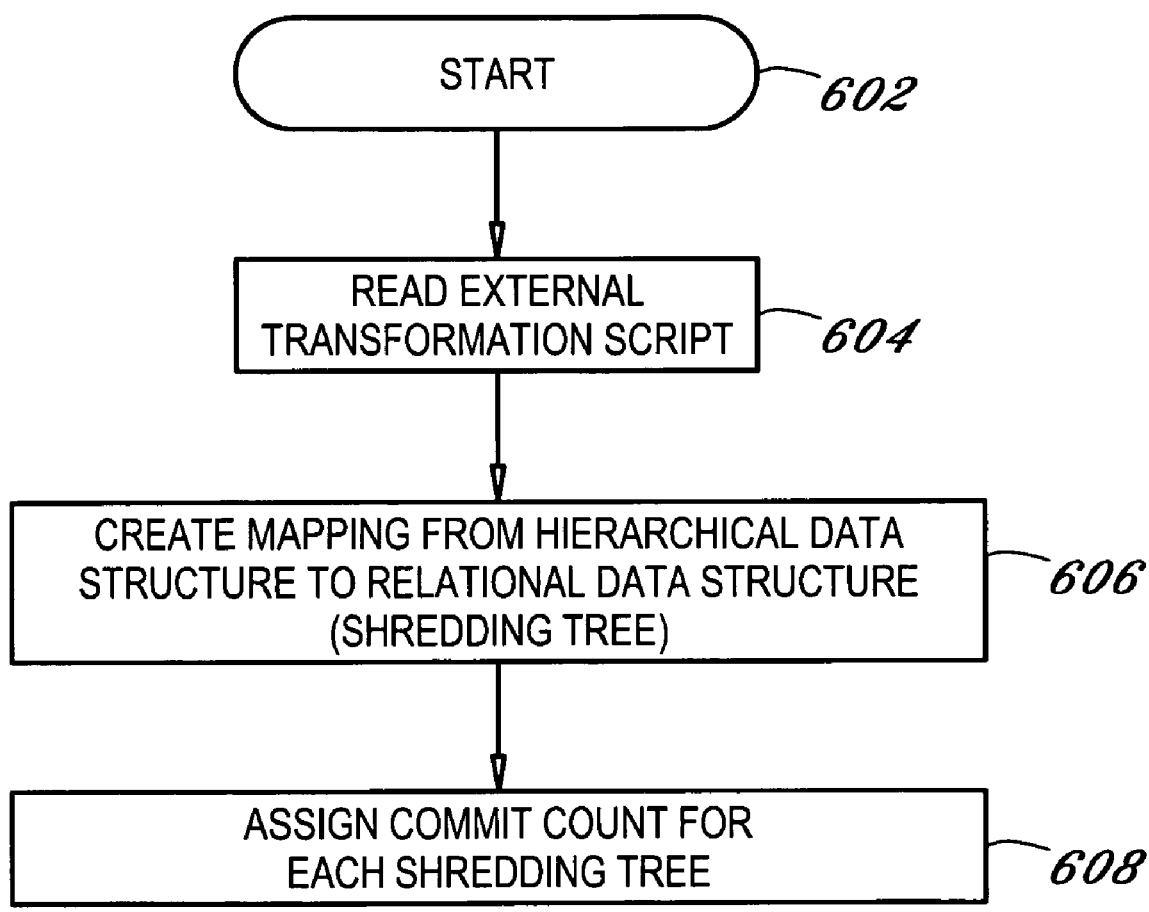
FIG. 6 is a flowchart for a shredding initialization processing in accordance with an exemplary embodiment of the present invention.

FIG. 6 is a flowchart for a shredding initialization processing 600 in accordance with an exemplary embodiment of the present invention. The operation and control flow of FIG. 6 depicts the configuration of a hierarchical data shredder in preparation for shredding a large hierarchical data structure, such as an exemplary instance of a hierarchical data structure 203, into a relational data structure 204 by using a mapping 205. The operation and control flow of FIG. 6 begins with step 602 and proceeds directly to step 604.

In step 604, a source hierarchical data structure definition, e.g., a schema tree such as described with reference to FIG. 3A, is read. This step includes reading an external transformation, or mapping, script, such as a DTDSA script. Next, in step 606, shredding trees that define a mapping for the translation of data from an instance of a hierarchical data structure 203 to a relational data structure 204 are generated based on the source hierarchical data structure read in step 604. In this step, the input mapping script is parsed. The shredding tree consists of the stored sequence of the traversal of the nodes of the schema tree and associates hierarchical data structure nodes with relational database columns.

The processing next assigns, at step 608, a commit count for each shredding tree that is generated. The value of the commit count that is assigned to each shredding tree is described below. As a result, the converter 202 is prepared for the translation of data from an instance of a hierarchical data structure 203 to a relational data structure 204.

Figure 7:
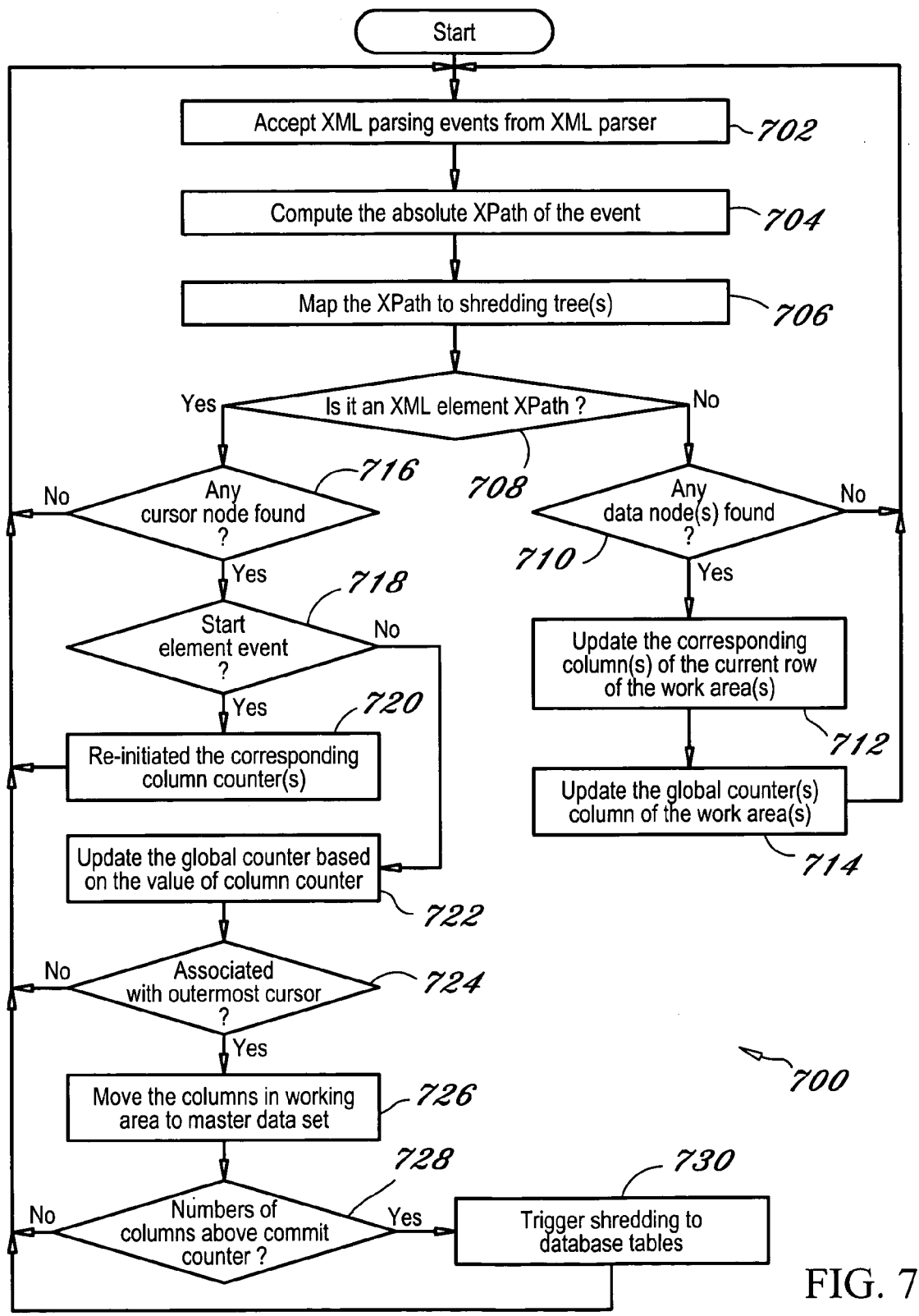
FIG. 7 illustrates a runtime processing flow in accordance with an exemplary embodiment of the present invention.

FIG. 7 illustrates a runtime processing flow 700 in accordance with an exemplary embodiment of the present invention. The runtime processing flow 700 begins by accepting, at step 702, XML parsing events from an XML parser. An XML parser is included within converter 202 in the exemplary embodiment and processes hierarchical data structure instances 203 to extract XML data elements. An XML parsing event occurs in the exemplary embodiment for each XML data element that is extracted from the hierarchical data structure 203. The XML data elements processed by the exemplary embodiment of the present invention include text nodes and attribute value nodes. XML parsing events are also able to be triggered by the start of an element, the end of an element, XML comments, processing instructions (PI), and whitespace. The processing next computes, at step 704, an absolute XPath of the event. This XPath describes the position of the extracted XML element within the hierarchical data structure. The processing next maps, at step 706, this XPath to the shredding tree or trees that define the shredding to be performed. The processing next determines, at step 708, if the XPath corresponds to an XML element. The XPath is also able to correspond to a text value or an attribute value. For example, the XPath/purchase_order/buyer/text( ) corresponds to the text value of the buyer element. As another example, the XPath/purchase_order/buyer/@buyer_id corresponds to the value of an attribute of the element "buyer" that has the name "buyer_id." If the XPath does not correspond to an XML element, the processing determines, at step 710, if any data nodes were found. If no data nodes were found, the processing returns to accepting, at step 702, XML parsing events.

If a data node was found, the processing updates, at step 712, the corresponding columns of the current row of the working area 212. The processing then updates, at step 714, the global counters column of the working area 212. The processing then returns to accepting, at step 702, XML parsing events.

If the XPath was determined, at step 708, to correspond to an XML element, the processing determines, at step 716, if any cursor nodes were found. If no cursor nodes were found, the processing returns to accepting, at step 702, XML parsing events. If cursor nodes were found, the processing determines, at step 718, if this is a start element event. If this was determined to be a start element event, the processing reinitiates, at step 720, the corresponding column counters that are maintained in the working area 212. The processing then returns to accepting, at step 702, XML parsing events.

If this is determined to not be a start element event, the processing updates, at step 722, the global counter based on the value of the column counter. The processing next determines if this element is associated with an outermost, i.e. highest level element, cursor. The processing determines receipt of elements associated with an outermost cursor since receiving an end element event for the outermost cursor signifies that the rows in the temporary working area are complete, i.e., all columns contain either filled-in values or default values and no more values are to be entered for these rows. Once the processing receives the end element event for the outermost cursor, the rows in the temporary working area are ready to be moved to the master data set. If this element is not associated with an outermost cursor, the processing returns to accepting, at step 702, XML parsing events. If this element is associated with an outermost cursor, the processing moves, at step 726, the columns in the working area 212 into the master data set. The processing next determines, at step 728, if the number of rows accumulated in the master data set is above the commit counter. If it is determined that the number of rows is above the commit counter, the processing triggers shredding, at step 730, of the data in the master data set into the database tables maintained by the relational database system. After triggering shredding or if the number of rows is not above the commit counter, the processing then returns to accepting, at step 702, XML parsing events.

As explained above, a shredding tree refers to a data mapping for translating data from a hierarchical data structure to a specific table structure of a relational data structure. A mapping from a hierarchical data structure to a relational data structure consists of one to more shredding trees. Shredding trees have two types of nodes: cursor nodes and data nodes. All of the nodes of a shredding tree are labeled with hierarchical, or node, locators. A node locator is a path expression obtained by concatenating the labels of the group of nodes from the root of the schema tree to a node in the schema tree. Each shredding tree has a local lookup table, which maps a node locator to its corresponding shredding tree node. A node locator can either correspond to a cursor node or a data node in a shredding tree, but not both in the exemplary embodiment.

Cursor nodes have several characteristics. First, each shredding tree has one or more cursor nodes. In addition, cursor nodes in the exemplary embodiment are alphabetically ordered by their node locators, such as an XPath for XML documents. Also, cursor nodes are non-leaf nodes and have at least one child data node and at most one child cursor node. Each cursor node corresponds to a data shredding processing loop in the shredding algorithm to be performed to shred the hierarchical data. Each cursor node in the exemplary embodiment is related to one repeating element in the XML document. Multiple cursor nodes are related to nested repeating elements. Each repeating element (e.g., the "lineitem" element in the example described above) is processed in a loop, and this results in nested processing loops for processing nested repeating elements. Each cursor node is also assigned a non-negative integer, called a cursor, at run time that is used to point to a specific tuple in a list of data tuples during the execution of the tree traversal algorithm for a hierarchical data structure.

Similarly, data nodes also have several characteristics. Each shredding tree has one or more data nodes and each data node corresponds to a column of the corresponding relational data structure. In addition, data nodes are leaf nodes and each data node inherits the cursor value of its parent cursor node.

In an embodiment where eXtensible Markup Language (XML) is translated to a Relational Database Management System (RDBMS), a cursor node points to an XML element. Cursor nodes are alphabetically ordered according to the XPath string representation for each cursor node. Data nodes point to XML attribute nodes or text nodes of an XML schema tree. An exemplary embodiment that translates XML into a format compatible with an RDBMS is described in greater detail below.

Figure 5A:
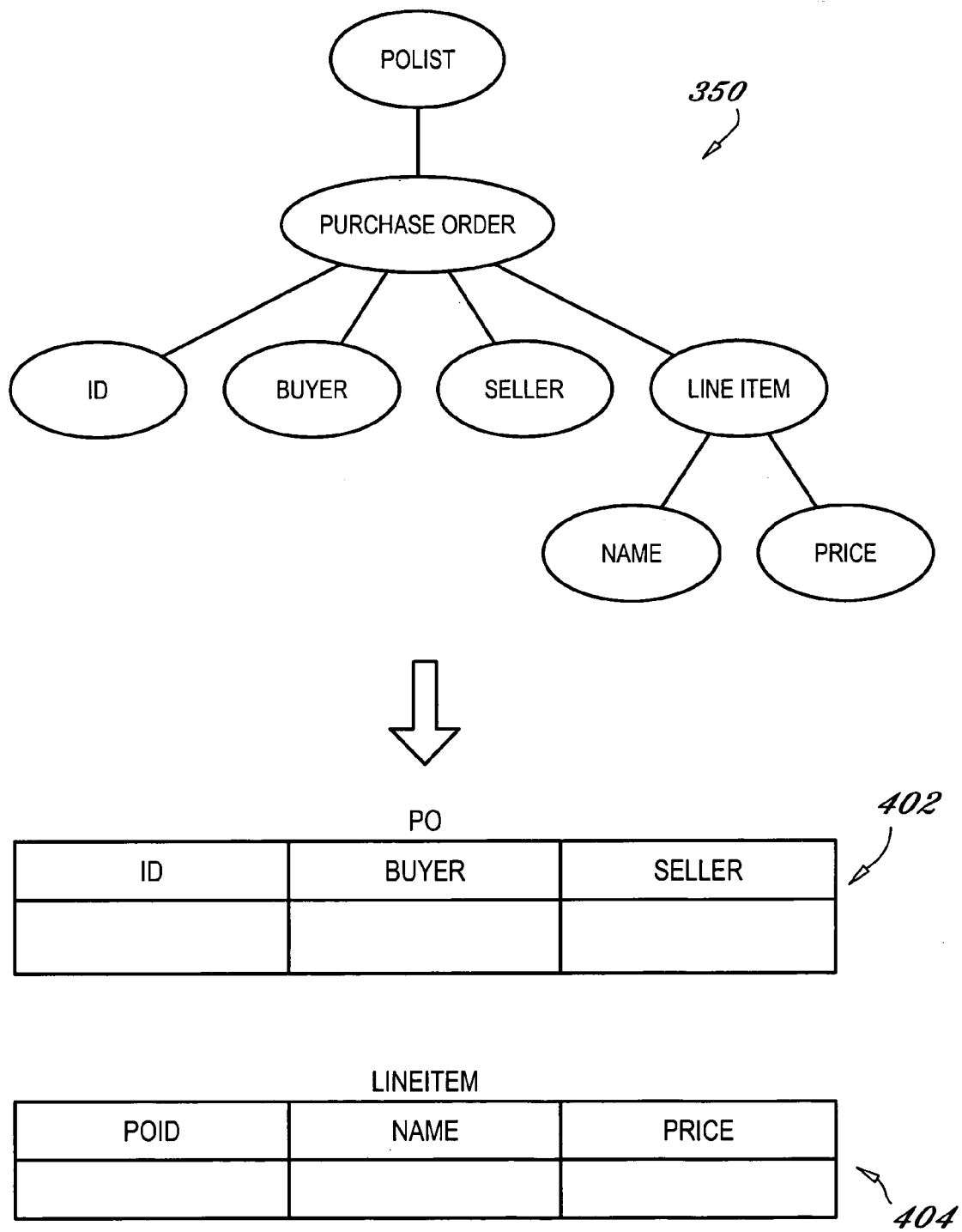
FIG. 5A is a block diagram illustrating a mapping of a Purchase Order List hierarchical stricture into relational structure represented as a Purchase Order (PO) table and a Line Item (LINEITEM) table in one embodiment of the present invention.

FIG. 5A is a block diagram illustrating a mapping of a Purchase Order List into a PO table and a Line Item table in one embodiment of the present invention. FIG. 5A shows the hierarchical data structure 350, which is then mapped to the relational data structure Purchase Order (PO) table 402 (as shown in FIG. 4A) and to the relational data structure Line Item (LINEITEM) table 404 (as shown in FIG. 4B). The manner in which data is mapped from one structure to the others is described in greater detail below.

Figure 5B:
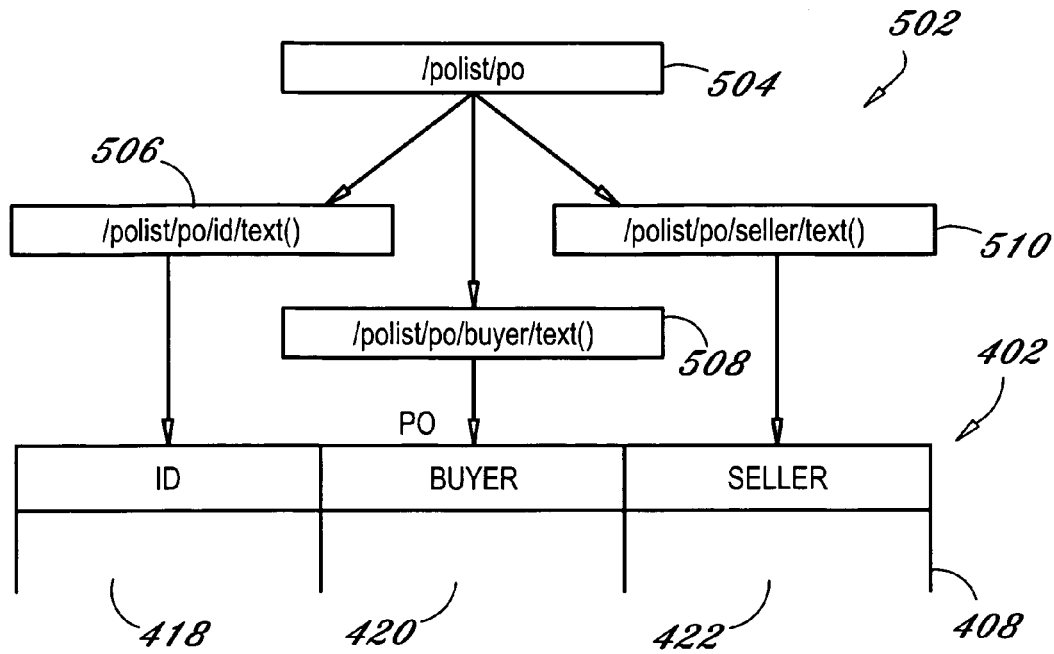
FIG. 5B is a block diagram illustrating a shredding tree for the Purchase Order (PO) table in one embodiment of the present invention.

FIG. 5B is a block diagram illustrating a shredding tree 502 of a Purchase Order data structure according to an exemplary embodiment of the present invention. The shredding tree 502 was generated via the mapping generation process using an external mapping specification, as described in greater detail above with reference to FIG. 7.

Upon commencement of the traversal algorithm, the first cursor node 504 (consisting of the node locator "/polist/po") is created, representing the root of the shredding tree 502. Next, the leftmost branch of the schema tree 350 is traversed, resulting in creation of the first shredding node 506 containing the node locator "/polist/po/id/text( )". Next, the second most leftmost branch of the schema tree 350 is traversed, resulting in creation of the second shredding node 508 containing the node locator "/polist/po/buyer/text( )". Next, the third leftmost branch of the schema tree 350 is traversed, resulting in creating the third shredding node 510 containing the node locator "/polist/po/seller/text( )". The first shredding node 506, the second shredding node 508 and the third shredding node 510 are data nodes since each may contain data associated with that node. For example, the first shredding node 506 is associated with data labeled "Purchase Order Id," the second shredding node 508 is associated with the data labeled "Buyer Name," and the third shredding data node 510 is associated with the data labeled "Seller Name."

FIG. 5B shows that the data of the first shredding node 506 maps to the ID column 418 of PO table 402. FIG. 5B also shows that the data of the second shredding node 508 maps to the buyer column 420 of PO table 402 and that the data of third shredding node 510 maps to the seller column 422 of PO table 402. Each shredding tree in the exemplary embodiment is associated with one Structured Query Language (SQL) command that is used to store the shredded data into a relational data structure, including tables and updateable views. This SQL command is associated with the tree via any data structure (e.g., a pointer to a string). This SQL command in the exemplary embodiment is associated to the shredding tree through an action file, as is described below.

Figure 5C:
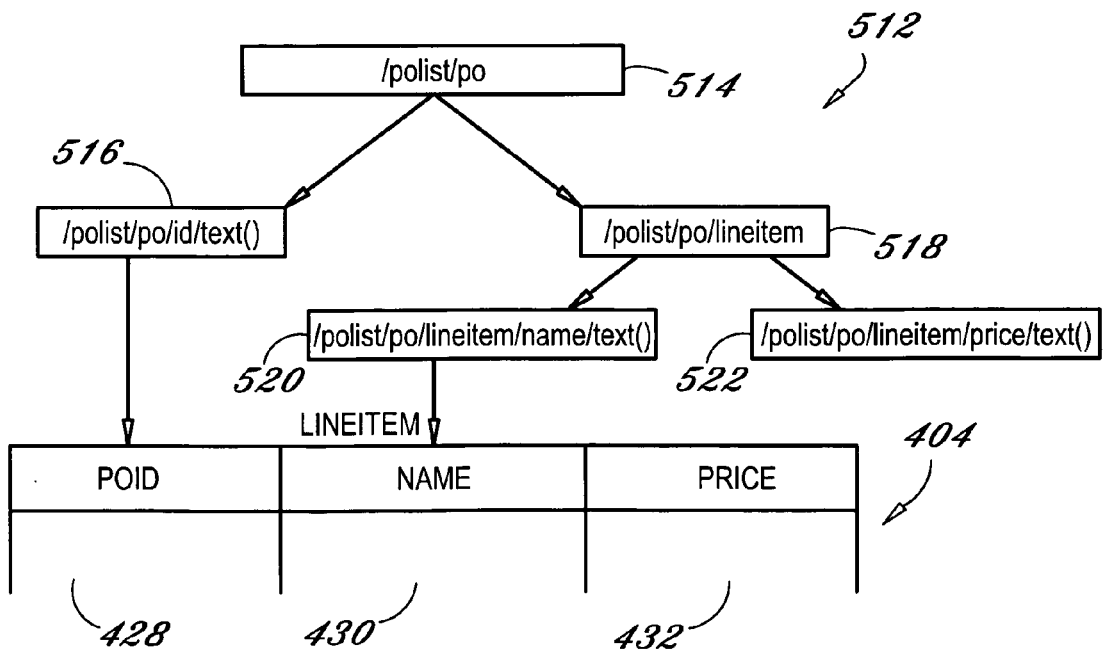
FIG. 5C is a block diagram illustrating a shredding tree for the Line Item (LINEITEM) table in one embodiment of the present invention.

FIG. 5C is a block diagram illustrating a shredding tree 512 of a Line Item data structure in one embodiment of the present invention. The shredding tree 512 was generated via the mapping generation process using an external mapping specification, as described in greater detail above with reference to FIG. 7.

Upon commencement of the external script parsing (such as DTDSA parsing), the first cursor node 514 (consisting of the node locator "/polist/po") is created, representing the root of the shredding tree 512. Next, the leftmost branch of the schema tree 350 is traversed, resulting in the shredding node 516, consisting of the node locator "/polist/po/id/text( )". Next, the fourth most leftmost branch of the schema tree 350 is traversed up to a cursor node, resulting in a second cursor node 518, consisting of the node locator "/polist/po/lineitem." Next, the fourth most leftmost branch of the schema tree 350 is further traversed, resulting in the shredding node 520, consisting of the node locator "/polist/po/lineitem/name/text( )". Finally, the fifth most leftmost branch of the schema tree 350 is traversed, resulting in the shredding node 522, consisting of the node locator "/polist/po/lineitem/price/text( )". Nodes 516, 520 and 522 are data nodes since each may contain data associated with that node. For example, node 520 is associated with data "Name," and node 522 is associated with data "Price."

FIG. 5C shows that the data of node 516 maps to column 428 of Line Item table (LINEITEM) 404. FIG. 5C also shows that the data of node 520 maps to column 430 of Line Item table 404 and that the data of node 522 maps to column 432 of Line Item table 404. These shredding nodes also include SQL commands to cause the data to be properly stored in the relational data structure.

The structure of XML documents is usually specified by document type definitions (DTD) or by XML Schema documents. In order to specify the mapping between a hierarchical document structure and a relational data structure, a notation is needed to indicate the relationship between XML nodes (elements or attributes) and columns of a relational data structure. One possible solution is an extension to the DTD notation, called DTDSA (document type definition with source annotations). DTDSA can be used for the purpose of defining XML views over a relational data structure, whereas in the exemplary embodiment of the present invention, an annotated DTD contains a mapping definition language for the opposite data conversion, i.e., mapping from a hierarchical XML structure to a relational data structure.

The DTDSA notation used in the exemplary embodiment is illustrated in the following example. An example of a conventional DTD that specifies the structure of an XML document containing a list of purchase orders is given below.

<!ELEMENT lpo (po*)>
<!ELEMENT po (id, buyer, seller, lineitem*)>
<!ELEMENT id #PCDATA>
<!ELEMENT buyer #PCDATA>
<!ELEMENT seller #PCDATA>
<!ELEMENT lineitem (name, price)>
<!ELEMENT name #PCDATA>
<!ELEMENT price #PCDATA>

Further, there is given the following relational data structure.
PO(ID, BUYERNAME, SELLERNAME)
LI(POID, ITEM, PRICE)

The above conventional DTD is annotated for use in the exemplary embodiment of the present invention with processing instructions that indicate for each leaf element (indicated by the identifier "#PCDATA") the table and column name of the relational data structure where the hierarchical data element is to be stored. Such an exemplary annotated DTD based upon the above conventional DTD is given below.

<!ELEMENT lpo (po* :: x :=row(PO))>
<!ELEMENT po (id, buyer, seller, lineitem* :: y :=row (LI, <POID>, <x.ID>)>
<!ELEMENT id #PCDATA : x.ID>
<!ELEMENT buyer #PCDATA : x.BUYERNAME>
<!ELEMENT seller #PCDATA : x.SELLERNAME>
<!ELEMENT lineitem (name, price)>
<!ELEMENT name #PCDATA : y.ITEM>
<!ELEMENT price #PCDATA : y.PRICE>

The above DTDSA is created through the following steps.

1) For every element with a repetition symbol (i.e., "*"), a variable is introduced and bound to a table name with a row( ) annotation, which is referred to as a "binding annotation." Two types of row( ) annotations are used in the exemplary embodiment. A first type of row( ) annotation is a row( ) annotation with a single argument that specifies the table. A second type of row( ) annotation has three arguments that specify a table, a list of columns of that table, and a list of values for those columns. An example of the second type of row( ) annotation is given above for the variable "y" that specifies that the value of column POID is equal to the value of the ID column of the current "x" tuple.

2) Every leaf element is given an expression of the form "variable.column," where the data item "variable" was previously bound to a table, and the data item "column" is a column of that table. In the above example, the specification of "x.BUYERNAME" specifies the column "BUYERNAME" of the table bound to "x." The "PO" table was bound to the "x" variable in the first line of this annotated DTD.

A DTDSA specification, such as the annotated DTD discussed above, is translated by the exemplary embodiment into a set of shredding trees, with one tree for each relational data structure table, according to the following processing.

1) A DTDSA parser converts the DTDSA file into an equivalent directed graph representation. In this conversion, a node labeled with the element name is created for every ELEMENT definition. A directed edge is drawn from node "b" to node "a" for every element name "a" that is mentioned in the definition of another element "b." If the element "a" has a repetition symbol, the edge is marked with a "star" symbol. Annotations are also attached in this conversion. Binding annotations are attached to their corresponding star edges and value annotations are attached to the leaf nodes they annotate. Additionally, a three argument row( ) annotation causes the generation of value annotations for every column mentioned in the second argument of that row( ) annotation. These value annotations are attached to the same leaf nodes as the corresponding values from the third argument of that row( ) annotation. An example is given by the annotation for the "y" variable above. A value annotation "y.POID" is generated and attached to the leaf node "id."

2) For every table, or equivalently, for every defined variable v, the directed graph obtained in the previous step is traversed from the root, and the current path from the root to the current node is maintained by the processing. For example, /lpo/po/lineitem is the path from the root node Ipo to lineitem. The shredding tree for the current table is constructed as follows.

(a) A cursor node is created and labeled with the current path for each binding annotation;
(b) For each value annotation containing the variable of interest "v," a value node is created and labeled with the path expression obtained by appending the string "/text( )" to the current path;
(c) Every time a node n is created (with the exception of the first node), it is attached as a child to the cursor node whose label constitutes the longest prefix into n's label; and
(d) As a last step, the shredding tree is pruned, by eliminating all cursor nodes that are not on a path from the root to a value node as such nodes are irrelevant for the current table.

This notation advantageously specifies the order of execution of SQL commands to be the same as the order of the SQL commands in the action file, as described below.

As an alternative notation, one can use annotated XML Schema documents. The XML Schema standard allows for application specific annotations inside the <appinfo> tags. The same syntax for binding and value annotations can also be used inside an XML Schema document (in the <appinfo> tags of the respective element definitions).

The above specification language defines mappings from XML to relational schema. In addition to these specifications, action specifications that indicate update actions to be applied to the relational data are also used. Such action specifications using the XML notation as used in the exemplary embodiment are described below.

The relational tables specified in the DTDSA file can have an associated SQL update statement that is able to consist of an INSERT, UPDATE, or DELETE statement. The following action file, labeled as "actions.xml" in this example, illustrates this specification.

```
<xi>
    <action variable = "x" commit_count="10">
    UPDATE PO
    SET BUYERNAME = x.BUYERNAME
    WHERE ID = x.ID
    </action>
    <action variable = "y" commit_count="20">
    INSERT INTO LI (POID, ITEM,PRICE)
    VALUES (x.POID, x.ITEM, x.PRICE)
```

```
    </action>
</xi>
```

The above action file refers to the variable names defined in the DTDSA file described above and specifies, for each variable, the specific operation to be executed. This action file uses the extension attribute "commit_count" to specify a row count after which a partial commit is able to be executed. In the above example, the data associated with the "x" element is specified to have a "commit_count" equal to ten, and the data associated with the "y" element is specified to have a "commit_count" equal to twenty. The run time engine implements these parameterized SQL data modification statements by replacing the "variable.COLUMN" expressions of the "values" sub-statement with the values to be stored into the indicated columns of the tuples as obtained by the shredding algorithm and used to store the data in the relational data structure.

In the common case where all actions are INSERTS, the file "actions.xml" is not mandatory; if an action file is not specified, the runtime engine assumes an INSERT behavior is intended and generates the appropriate INSERT statements.

Figure 9:
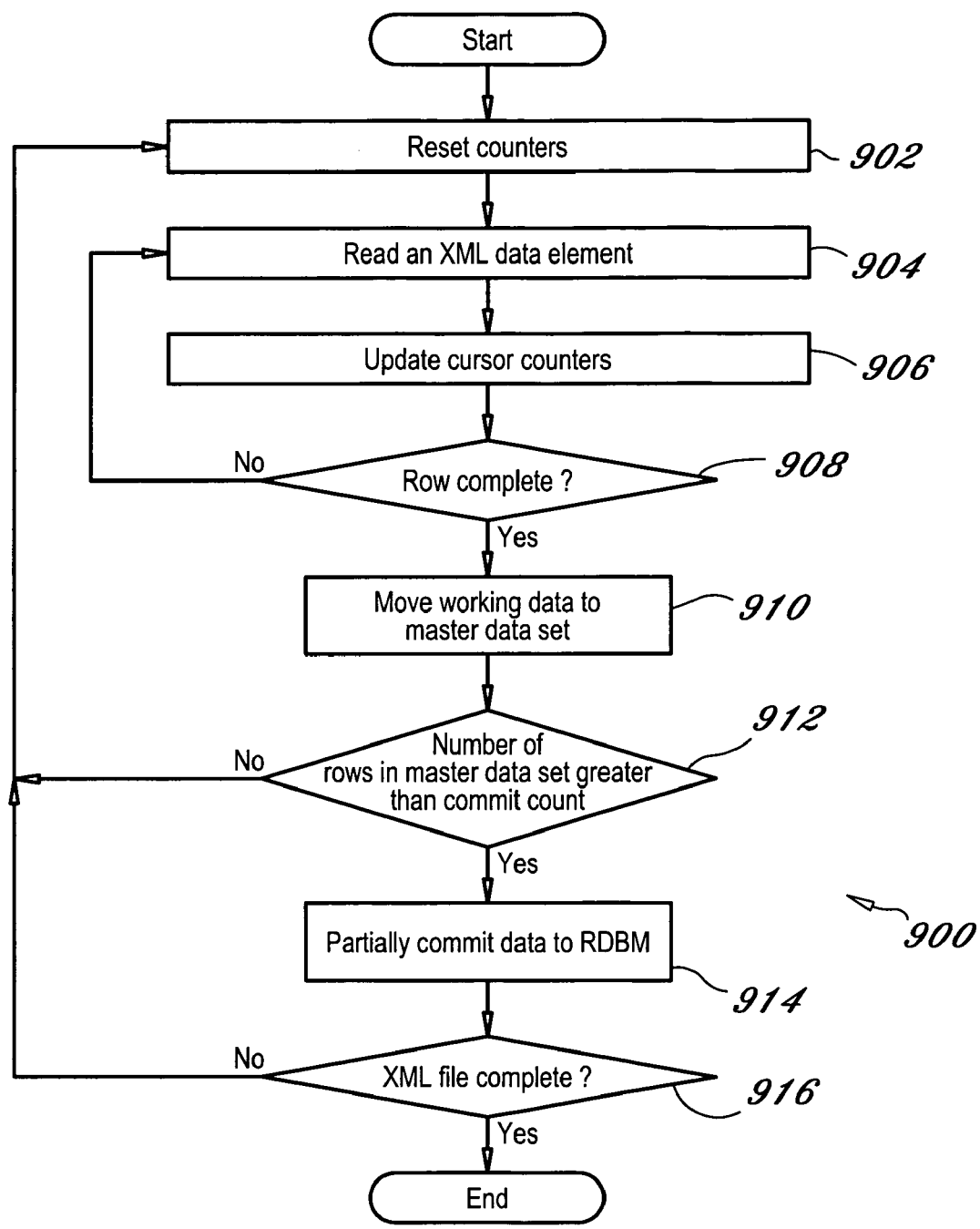
FIG. 9 illustrates a flowchart for a detailed translation processing according to an exemplary embodiment of the present invention.

FIG. 9 illustrates a flowchart for a detailed translation processing 900 according to an exemplary embodiment of the present invention. The mapping 205 of the exemplary embodiment of the present invention has an associated global counter. Each cursor node of the mapping 205 is further associated with its own cursor counter. The cursor counters of the exemplary embodiment are arranged in an array maintained by converter 202. The detailed translation processing 900 begins by initializing, at step 902, the global and cursor counters. Each cursor counter is initialized with the value of the number of data nodes that descend from its associated cursor node. The global counter is initiated with the number of columns in the temporary data set in the working area 212.

The processing next reads, at step 904, an XML data element. The XML data elements are read using a tree traversal algorithm defined by the mapping 205. The processing next updates, at step 906, the cursor counters. The processing of the exemplary embodiment reduces the global counter by the number of columns that are updated each time an XML data element is shredded into the relational data structure within the working area 212. The processing usually updates one column for each XML data element shredded, resulting in a reduction of the global counter by one. For each updated column, the cursor counter that corresponds to the parent cursor node for the shredded data is also reduced by one. When the processing encounters an end of cursor event, the value of the cursor counter associated with the cursor having the end of cursor event is checked and if it is non-zero, its value is subtracted from the global counter. An end of cursor event is generated in the exemplary embodiment for each end of element event for the element associated with the cursor. This accommodates hierarchical data in which some of the data elements, which correspond to columns in the relational data structure, are missing and cause those corresponding columns of the relational data structure to be assigned NULL values. A start element event for the element associated with the cursor, i.e., pointed to by the XPath, triggers a start cursor event in the exemplary embodiment of the present invention. When a start cursor event is encountered, the corresponding cursor counter is re-initialized to the number of data nodes of that cursor.

The processing then determines, at step 908, if the current row being assembled in the working area 212 is complete. The exemplary embodiment uses the cursor counter array and the global counter to determine when this row of data is complete. Each cursor counter in the counter array corresponds to one cursor node. A cursor counter being decremented to zero indicates that no more data values will be received for the columns that are bound to children of the data nodes of the associated cursor node. The global counter being decremented to zero indicates that no more data values are expected for any column, which also indicates that the rows in the temporary working area are complete. In the exemplary embodiment, the global counter has a value that is equal to the sum of all of the values of the cursor counters but the global counter and the cursor counters are incremented and decremented separately so that no sum is ever computed. If it is determined that the row is not complete, the processing returns to reading, at step 904, another XML data element from the instance of the hierarchical data structure.

If the row of relational data being assembled in the working area 212 is determined to be complete, the processing moves, at step 910, the data stored in the working data 212 into the master data set stored in the temporary storage 210. After that data is moved, the processing determines, at step 912, if the number of relational data rows in the master data set is greater than a predetermined commit count. The predetermined commit count used by the exemplary embodiment is determined based upon the amount of memory allocated to the temporary storage 210 and the amount of data allocated to each data element stored in the temporary storage 210.

The value of the predetermined commit count can be based on the amount of internal memory available for the working data sets and the master data set. The predetermined commit count is also based on the relative rate of occurrence of each relational data table. This rate of occurrence can be estimated by analyzing the statistical distribution of the XML elements. For example, if such an analysis indicated that there are on average five "lineitem" elements for each purchase order, the commit counts can be proportionally set. In this example of five "lineitem" elements for each purchase order, a commit count for the "PO" table can be set to one hundred and a commit count for the "LINEITEM" table can be set to five hundred. In the operation of the exemplary embodiment, this estimate is not required to be precise as it does not affect the correctness of the shredding process. If the number of rows in the master data set is determined to not be greater than the commit count, the processing returns to resetting, at step 902, the counters, as described above, and further continuing the processing that is also described above.

If the number of rows in the master data set is determined to be greater than the commit count, the processing continues with partially committing, at step 914, the data in the master data set stored in the temporary storage 210 into the relational database maintained by a relational database management system (RDBMS). This committing of data to the RDBMS is performed by executing Structured Query Language commands in the order specified by the mapping 205. Once this data is committed to the RDBMS, the master data set is purged from the temporary storage 210.

After the data is committed to the RDBMS, the processing determines, at step 916, if the processing of the XML file is complete. If there is further XML data in the instance of the input hierarchical data 203, the processing returns to resetting, at step 902, the counters as described above, and further continues the processing also described above. If the processing of the XML data is complete, the processing then terminates.

Figure 8:
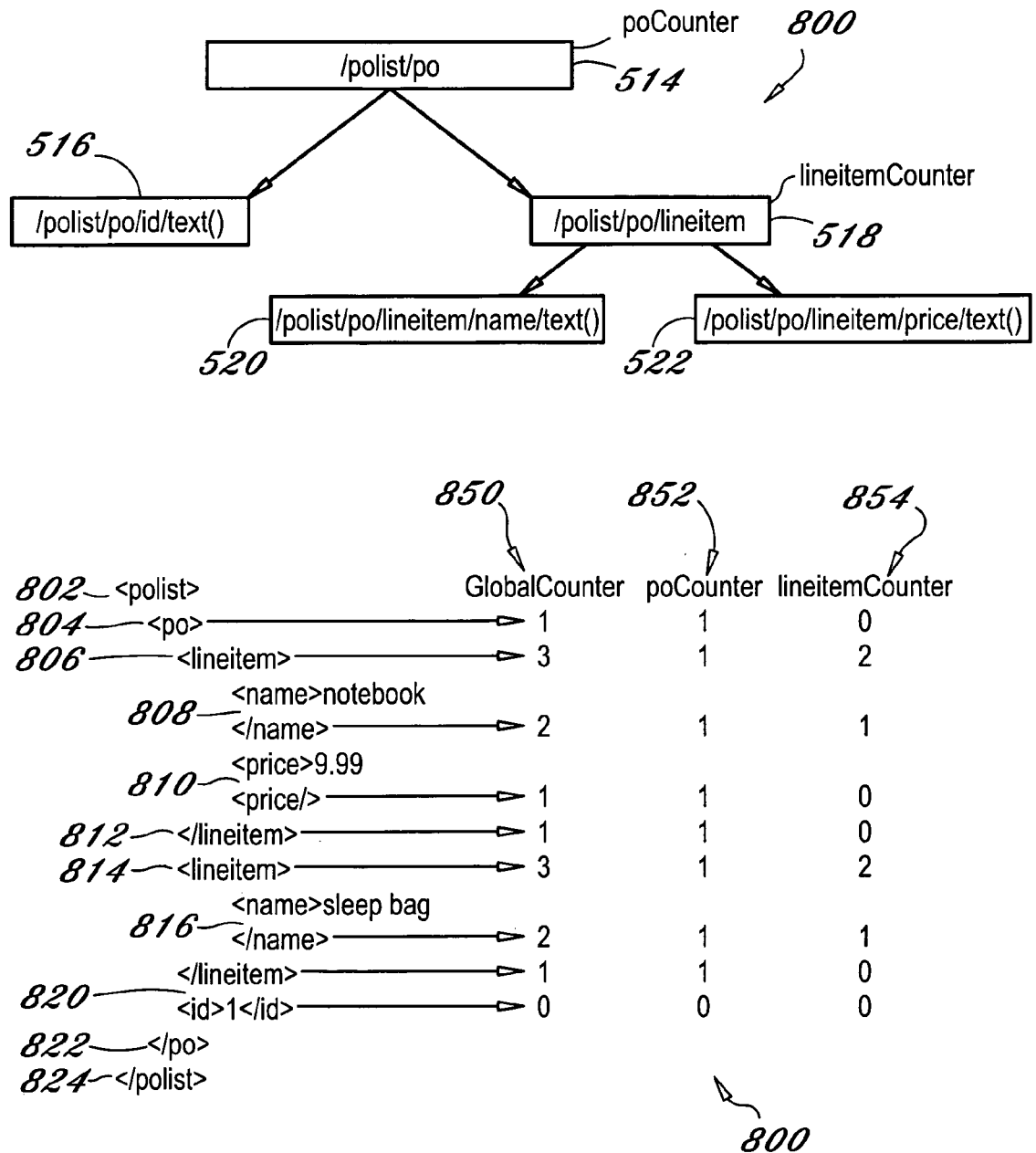
FIG. 8 illustrates the counter operations in accordance with an exemplary embodiment of the present invention.

FIG. 8 illustrates the counter operations 800 in accordance with an exemplary embodiment of the present invention. This counter operation illustration 800 is based upon the exemplary purchase order list mapping that is illustrated in FIG. 5C and described above. The exemplary purchase order list of FIG. 5C has two cursor nodes, the first cursor node 514 and the second cursor node 518. The global counter values 850 and the values of the two counters associated with the cursor counter, i.e., the poCounter value 852 and the lineitemCounter value 854, are illustrated at various times during the shredding processing.

When the first cursor node 514 is encountered, as is represented by the hierarchical tag <po> 804 in the exemplary counter operations 800, the poCounter 852 is initialized to "1" since there is one data node associated with the first cursor node 514, i.e., the "id" shredding node 516. Since the second shredding node 518 has not yet been encountered, the lineitemCounter 854 is initialized to zero. The global counter is also set to a value equal to the sum of the poCounter 852 and the lineitemCounter 854, i.e., "1."

When the second cursor node 518 is encountered, as is represented by the hierarchical tag <lineitem> 806 in the exemplary counter operations 800, the lineitemCounter 854 is set to "2," which is the number of shredding or data nodes associated with the second cursor node 518. This results in setting the global counter to "3." Shredding of the data associated with the "name" shredding node 520, which is represented by the "name" hierarchical data 808, causes the lineitemCounter and the global counter to decrement by one, which is the number of shredding nodes processed in this exemplary step. Shredding of the data associated with the "price" shredding node 522, which is represented by the "price" hierarchical data 810, causes the lineitemCounter and the global counter to decrement by one, which is the number of shredding nodes processed in this exemplary step. Encountering the lineitem end tag 812 indicates that this data element is closed, and that the lineitemCounter 854 should be set to zero, as it is in this case.

When the second cursor node 518 is again encountered, as is represented by the second hierarchical tag <lineitem> 814 in the exemplary counter operations 800, the lineitemCounter 854 is again set to "2," which is the number of shredding or data nodes associated with the second cursor node 518. This results in again setting the global counter to "3." Shredding of the data associated with the "name" shredding node 520, which is represented by the second "name" hierarchical data 816, causes the lineitemCounter and the global counter to decrement by one, which is the number of shredding nodes processed in this exemplary step. Encountering the second lineitem end tag 820 indicates that this data element is closed, and that the lineitemCounter 854 should be set to zero, as it is in this case. Since in this example there was no "price" hierarchical data item associated with the "sleep bag" second hierarchical line item, the lineitemCounter did not have a value of zero and that counter is then reset to zero upon encountering the second lineitem end tag 820.

The shredding then encounters the "id" hierarchical data element 822 that is associated with the "id" shredding node 516 that is associated with the "po" cursor node 514. Shredding this hierarchical data element causes the poCounter 852 to decrement, which causes the Global-Counter to also decrement. At this point, all counters have a value of zero.

In one embodiment of the present invention, the traversal of the instance of the hierarchical data structure consists of a single depth-first tree walk of the structure—the instance tree. First, the algorithm loops through all the shredding trees, and creates an empty set object for each shredding tree; this is referred to as the master data set. Second, a depth-first tree traversal of the instance tree is performed. For each node of the hierarchical data tree, the node locator is stored. From the global lookup table, the corresponding shredding tree is determined based on the node locator. For the node locator, the algorithm loops through all of the shredding trees corresponding to the instant node locator.

When a node is first entered for traversal, for a given shredding tree, if the node locator corresponds to a cursor node, the resulting actions are as follows.

1. If the cursor node points to the outermost cursor, a new data set is created (referred to as the current data set). The outermost cursor is the cursor owned by the root node of the shredding tree. A new temporary empty tuple is created.
2. For any cursor node, its cursor will point to the current tuple of the data set.
3. For the current data set, when the innermost cursor node is encountered, a new tuple is created and the data from the temporary tuple is copied into the new tuple. This new tuple is referred to as the current tuple. The innermost cursor node is the cursor node that has the largest depth.

When a node is first entered for traversal, for a given shredding tree, if the node locator corresponds to a data node, the resulting actions are as follows.

1. Acquire the parent node, which is a cursor node.
2. Find the row of the data set pointed by the current cursor node. This row is referred to as the start row.
3. Acquire the cursor node that is the parent node of the data node.
4. Insert data into the column of each tuple from the tuple pointed by the cursor node and to the current tuple.

When a node is first exited for traversal, for a given shredding tree, if the node locator corresponds to a cursor node, the resulting actions are as follows.

1. Identify all the child data nodes of the cursor node.
2. Acquire all the columns associated with children of these data nodes.
3. Copy the current tuple into a temporary tuple.
4. For this temporary tuple, set values of all the columns as nulls.
5. If the cursor is the outermost cursor, move the current data set into the master data set of the shredding tree.

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

An embodiment of the present invention can also be embedded in a computer program product that includes all the features enabling the implementation of the methods described herein, and which—when loaded in a computer system—is able to carry out these methods. Computer program means or computer program as used in the present invention indicates any expression, in any language, code or notation, of a set of instructions intended to cause a system having an information processing capability to perform a particular function either directly or after either or both of the following a) conversion to another language, code or, notation; and b) reproduction in a different material form.

A computer system may include, inter alia, one or more computers and at least a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may include computer readable information in a transitory state medium such as a network link and/or a network interface, including a wired network or a wireless network, that allow a computer system to read such computer readable information.

Figure 10:
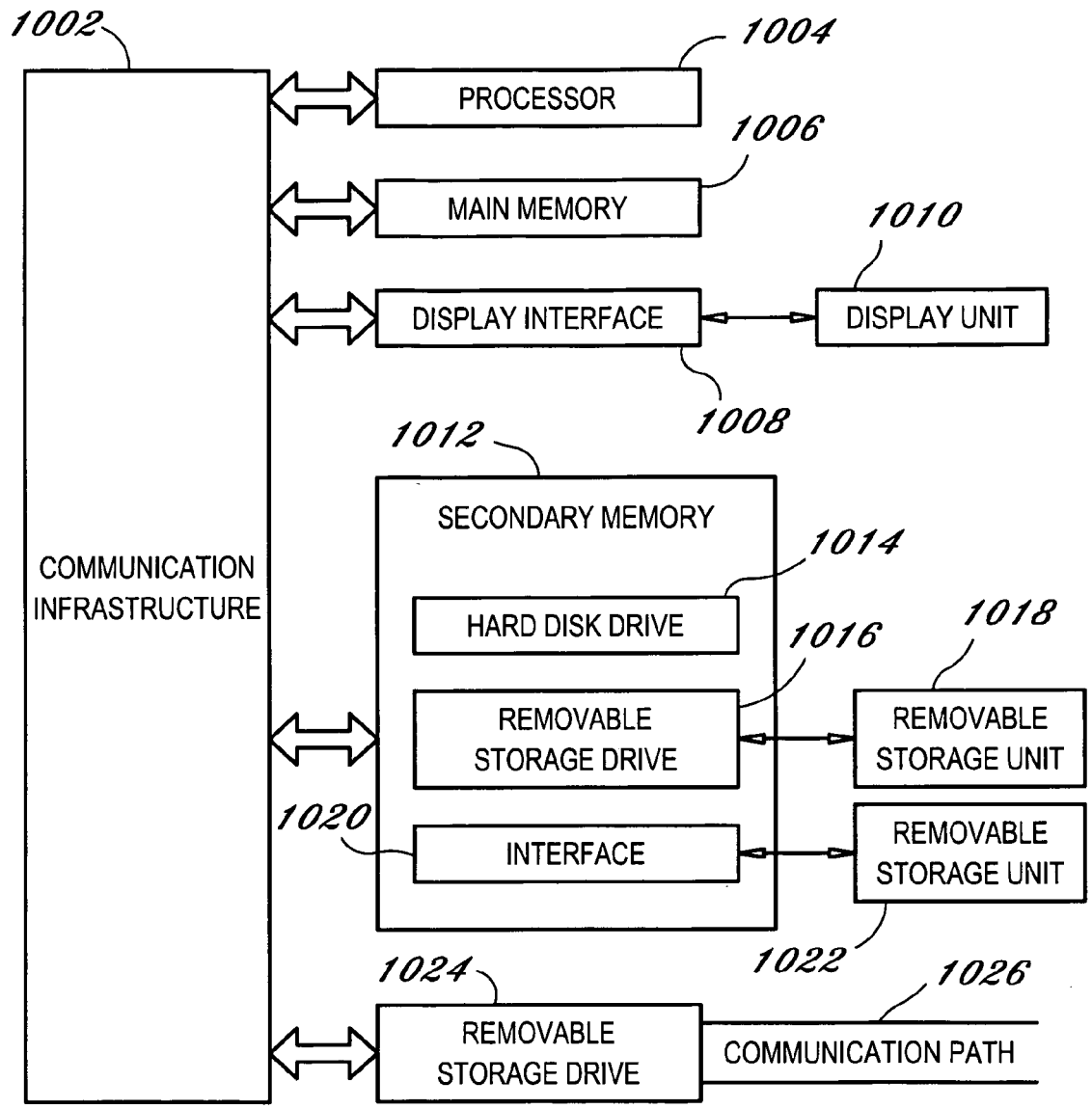
FIG. 10 is a block diagram of a computer system useful for implementing the present invention.

FIG. 10 is a block diagram of a computer system useful for implementing an embodiment of the present invention. The computer system of FIG. 10 is a more detailed representation of the computer 104 or the computer system of database 106 in one embodiment of the present invention. The computer system of FIG. 10 includes one or more processors, such as processor 1004. The processor 1004 is connected to a communication infrastructure 1002 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 1008 that forwards graphics, text, and other data from the communication infrastructure 1002 (or from a frame buffer not shown) for display on the display unit 1010. The computer system also includes a main memory 1006, preferably random access memory (RAM), and may also include a secondary memory 1012. The secondary memory 1012 may include, for example, a hard disk drive 1014 and/or a removable storage drive 1016, representing a floppy disk drive, a magnetic tape drive, an optical disk drive, etc. The removable storage drive 1016 reads from and/or writes to a removable storage unit 1018 in a manner well known to those having ordinary skill in the art. Removable storage unit 1018, represents, for example, a floppy disk, magnetic tape, optical disk, etc. which is read by and written to by removable storage drive 1016. As will be appreciated, the removable storage unit 1018 includes a computer usable storage medium having stored therein computer software and/or data.

In alternative embodiments, the secondary memory 1012 may include other similar means for allowing computer programs or other instructions to be loaded into the computer system. Such means may include, for example, a removable storage unit 1022 and an interface 1020. Examples of such may include a program cartridge and cartridge interface (such as that found in video game devices), a removable memory chip (such as an EPROM, or PROM) and associated socket, and other removable storage units 1022 and interfaces 1020 which allow software and data to be transferred from the removable storage unit 1022 to the computer system.

The computer system may also include a communications interface 1024. Communications interface 1024 allows software and data to be transferred between the computer system and external devices. Examples of communications interface 1024 may include a modem, a network interface (such as an Ethernet card), a communications port, a PCM-CIA slot and card, etc. Software and data transferred via communications interface 1024 are in the form of signals which may be, for example, electronic, electromagnetic, optical, or other signals capable of being received by communications interface 1024. These signals are provided to communications interface 1024 via a communications path (i.e., channel) 1026. This channel 1026 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 1006 and secondary memory 1012, removable storage drive 1016, a hard disk installed in hard disk drive 1014, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer readable medium may include computer readable information in a transitory state medium such as a network link and/or a network interface, including a wired network or a wireless network, that allow a computer to read such computer readable information.

Computer programs (also called computer control logic) are stored in main memory 1006 and/or secondary memory 1012. Computer programs may also be received via communications interface 1024. Such computer programs, when executed, enable the computer system to perform the features of the present invention as discussed herein. In particular, the computer programs, when executed, enable the processor 1004 to perform the features of the computer system. Accordingly, such computer programs represent controllers of the computer system.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A method for translating data in a hierarchical data structure to a relational data structure, the method comprising the steps of:

defining at least one shredding tree that each translate a hierarchical data structure into a relational data structure, each of the at least one shredding tree defining a hierarchical data structure comprising at least one cursor node and at least one data node, wherein each of the at least one cursor node defines, in conjunction with parent cursor nodes, a column within the relational data structure, and each of the at least one data node being an immediate child of a respective parent cursor node within the at least one cursor nodes, each of the at least one data node comprising a respective data element to be inserted at the column defined by the respective parent cursor node;

reading at least one data element from a subset of the at least one data node of a first part of a hierarchical data structure instance using a tree traversal algorithm defined by the at least one shredding tree;

storing the at least one data element in a first storage according to the relational data structure defined by a current shredding tree comprising the at least one data node containing the at least one data element;

maintaining a set of tree commit counter, each tree commit counter being associated with a respective shredding tree within the at least one shredding tree;

maintaining a global commit counter;

decrementing, in response to the storing, a current tree commit counter within the set of tree commit counters, the current tree commit counter being associated with the current shredding tree;

decrementing, in response to the storing, the global commit counter, determining, in response to the storing, that the first storage stores a quantity of data that is greater than a threshold and that at least one of a tree commit counter within the set of tree commit counters and the global commit counter has been decremented to zero; and in response to the determining, transferring data stored in the first storage into a relational data structure according to the mapping.

2. The method of claim 1, wherein each of the at least one shredding tree is associated with a single structured query language command to modify data within the relational data structure, and wherein the transferring step includes the sub-step of executing the at least one structure query language command according to the mapping.

3. The method of claim 1, wherein the hierarchical data structure has a size that is larger than a capacity of the first storage.

4. The method of claim 1, wherein the shredding tree is defined by one of an annotated XML schema an annotated document type definition document, the one of the annotated XML schema and annotated document type definition document defining a hierarchical data structure definition with annotations, wherein the annotations comprise a first set of annotations for at least one leaf node of the hierarchical data structure definition that define a respective binding between a data element of the respective at least one leaf node and a column of the hierarchical data structure.

5. The method of claim 1, further comprising:

completely traversing all node of the current shredding tree; and decrementing, in response to completely traversing the current shredding tree, the global commit counter by a value remaining in the current tree commit counter.

6. The method of claim 4, wherein the first set of annotations are associated with a first shredding tree within the at least one shredding tree, wherein the first binding defines a variable, and wherein the first annotated document type definition document further comprises at least a second set of annotations that define a respective relationship between the respective binding and a respective separate relational data structure defined by a separate shredding tree within the at least one shredding tree.

* * * * *